UNITED STATES PATENT OFFICE.

SAMUEL R. SCHARF, OF BALTIMORE, ASSIGNOR TO HIMSELF, JAMES SPICER, AND JAMES N. BURNHAM, OF BALTIMORE COUNTY, MARYLAND.

IMPROVED FIRE AND WATER PROOF CEMENT.

Specification forming part of Letters Patent No. 88,745, dated April 6, 1869.

*To all whom it may concern:*

Be it known that I, SAMUEL R. SCHARF, of Baltimore, in the county of Baltimore and State of Maryland, have invented a new and useful Improved Fire and Water Proof Roofing-Cement; and I do hereby declare that the following is a full and exact description thereof.

My invention or improvement in roofing-cement consists of a new composition of coal-tar pitch, distilled coal-tar, hydraulic cement, fire-proof paint, and copperas, prepared and used in the following manner:

Take of coal-tar pitch about twenty (20) parts, by weight; take of distilled coal-tar about twenty (20) parts, by weight; take of hydraulic cement about forty (40) parts, by weight; take of fire-proof paints about eight (8) parts, by weight; take of copperas about one (1) part, by weight.

The proportion of the several ingredients used in the above composition may be varied according to the climate in which it is to be used, and the amount of heat and cold it is required to stand.

In applying the above composition or cement for roofing purposes, I take either boards closely fitted together, or rough boards covered with felt. Then the coal-tar pitch and distilled coal-tar are put into a kettle and heated, when the copperas is added, and afterward the cement and paint, and the whole mass thoroughly mixed by stirring.

The mass, when hot enough for spreading, is applied to the boards, tin, or felt by means of a brush or other suitable implement.

The consistency of the mass may be varied according to the use for which it is to be applied. For covering old tin roof or railroad-ties, the composition need not be so thick as when used upon boards or felt, as above described, for new buildings.

This composition is very valuable for covering railroad-ties, the timbers of bridges, and other timbers of various descriptions.

Having thus fully described my invention, I claim—

The above-described composition or roofing-cement, made and used substantially in the manner and for the purposes set forth.

SAML. R. SCHARF.

Witnesses:
G. W. DAVIS,
SARAH E. SPARKS.